United States Patent [19]
Rhyner

[11] 4,239,952
[45] Dec. 16, 1980

[54] ELECTRODE WIRE EDM APPARATUS

[75] Inventor: Heinz Rhyner, 25, chemin de la Naz, Bernex, Geneva, Switzerland

[73] Assignee: Ateliers des Charmilles S.A., Geneva, Switzerland

[21] Appl. No.: 26,446

[22] Filed: Apr. 2, 1979

[30] Foreign Application Priority Data

Apr. 14, 1978 [CH] Switzerland ............. 4013/78

[51] Int. Cl.³ ............................................. B23P 1/08
[52] U.S. Cl. ............................................. 219/69 W
[58] Field of Search ................................. 219/69 W

[56] References Cited

U.S. PATENT DOCUMENTS

| | | | |
|---|---|---|---|
| 3,671,705 | 6/1972 | Raznitsyn | 219/69 W X |
| 4,084,074 | 4/1978 | Gilleland et al. | 219/69 W |
| 4,163,887 | 8/1979 | Büler et al. | 219/69 W X |

FOREIGN PATENT DOCUMENTS

2810437  9/1978  Fed. Rep. of Germany ....... 219/69 W

*Primary Examiner*—Thomas J. Kozma
*Assistant Examiner*—D. A. Tone
*Attorney, Agent, or Firm*—Hauke and Patalidis

[57] ABSTRACT

An arrangement for connecting the terminals of the pulse generator of an EDM apparatus across an electrode wire and an electrode workpiece for effecting a cut applied in the machining zone between the electrode wire and the electrode workpiece. The machining current pulses are fed across the machining zone through a pair of sliding contacts, a capacitor being connected across the sliding contacts. One of the sliding contacts is engaged with the electrode wire and the other is connected to the workpiece. The capacitor is alternatively charged by the pulse generator and discharged through a low inductance circuit, thus providing in the machining zone current pulses each of short duration and having a sharp and steep leading edge.

2 Claims, 2 Drawing Figures

ELECTRODE WIRE EDM APPARATUS

BACKGROUND OF THE INVENTION

The machining efficiency of an electrode wire EDM apparatus is greatly improved by applying across the machining zone between the electrode wire and the electrode workpiece current pulses of very short duration which are provided with a sharp, steep leading edge. Steep leading edge pulses can be obtained only if the pulse generator circuit connected across the electrodes has a very low impedance and inductance. It is therefore advantageous to decrease as much as possible the self-inductance of the electrical connections between the pulse generator, the electrode wire and the workpiece.

A known method for achieving such a result consists in connecting the pulse generator to the electrode wire by means of a first sliding contact mounted on one of the guiding arms of the electrode wire and to the workpiece by means of a second sliding contact supported by the same electrode wire guiding arm, the second sliding contact being maintained in engagement with the surface of the workpiece proximate the guiding arm. Such a device, however, presents the inconvenience of being practical only if the workpiece surface, with which the sliding contact is engaged, has been prepared such as to be relatively flat and to provide a good electrical contact. If the workpiece has a variable thickness, or if its surface is rough or is a poor conductor of electricity, such an arrangement is not practical.

The present invention remedies the inconveniences and limitations of the prior art devices. The invention permits the self-inductance of the circuit supplying the electrical discharge pulses to the electrodes to be reduced to a minimum, and does not rely on the shape of the workpiece or on the electrical conductance of the workpiece surface for its operation.

SUMMARY OF THE INVENTION

The principal object of the invention is to provide an arrangement for supplying electrical current pulses through the machining zone between an electrode wire and an electrode workpiece in an EDM apparatus, wherein the electrode wire and the workpiece are translated one relative to the other according to a predetermined cutting path in the workpiece, the electrode wire being stretched and fed longitudinally between a pair of support and guide arms, such arrangement comprising a first contact in sliding engagement with the electrode wire mounted on one of the electrode wire guide arms and connected to a terminal of the pulse generator and a second contact mounted proximate to the first contact. At least one capacitor supported by the electrode wire support and guide arm is connected across the first and second sliding contacts, the second contact being electrically connected to the surface of a metallic plate mounted on the frame of the machine and thereby electrically connected through the plate and frame to the workpiece.

As a result of the structure of the invention, the length of the capacitor discharge circuit is as short as feasible. The invention presents the advantage of providing an efficient electrical contact between the sliding contacts and the metallic plate mounted on the machine frame by choosing carefully the contacts and the plate materials. A further advantage of the invention is derived from the fact that the electrical connection between the pulse generator and the EDM machine needs not be specially designed such as to have a very low self-inductance. According to the invention, one of the termals of the pulse generator is connected to one of the contacts in sliding engagement with the electrode wire and the other terminal of the pulse generator is connected directly to the workpiece, as in conventional apparatus, or to the plate with which a second contact is in sliding engagement.

BRIEF DESCRIPTION OF THE DRAWING

In the drawing, wherein there is illustrated an example of structure according to the present invention.

DETAILED DESCRIPTION OF THE PREFERRED EMBODIMENT

Figure 1:
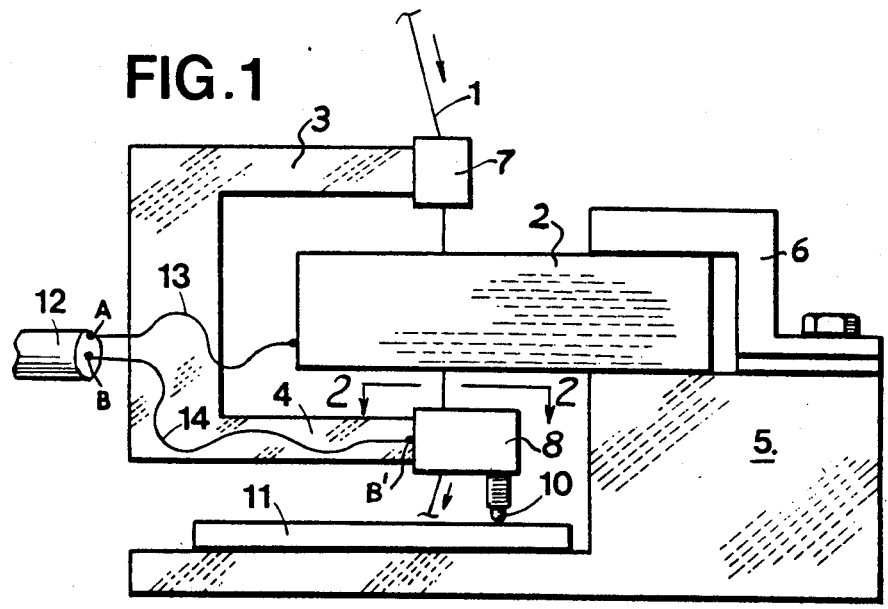
FIG. 1 is a general simplified view of an EDM apparatus provided with the present invention.

The EDM apparatus illustrated at FIG. 1 comprises an electrode tool 1 in the form of a wire used for effecting a cut in a workpiece 2 according to a path as preprogrammed by a template or a numerical control, or otherwise. The electrode wire 1 is stretched and displaced along its longitudinal axis between two guide arms 3 and 4 disposed each on one side of a machining zone formed between the electrode wire 1 and the workpiece 2. The device for longitudinally feeding the electrode wire, as well as the means for laterally displacing the electrode wire relative to the workpiece, are well known and are not illustrated at FIG. 1 as they do not form part of the present invention. The workpiece 2 is supported on the base of the frame 5 of the apparatus by means of any appropriate convenient mounting means, such as a clamp 6. The electrode wire support arms 3 and 4 are provided respectively with electrode wire support and guiding members 7 and 8, each made for example by a block of sapphire provided with a V-groove. As shown in more details at FIG. 2, the lower wire support and guide member 8 is provided with a first sliding contact 9 in engagement with the electrode wire 1, and with a second sliding contact 10 in sliding engagement with a metallic plate 11 mounted on the frame 5 of the EDM apparatus. The pulse generator, not shown, is connected to the EDM apparatus by means of a coaxial cable 12 having a first terminal A connected to the workpiece 2 by means of a flexible electrical cable 13, and a second terminal B connected to the first sliding contact 9 by means of a flexible electrical cable 14 attached to a terminal B'. It is readily apparent that alternatively, the flexible electrical cable 13 may be connected to the plate 11 or to the sliding contact 10.

Figure 2:
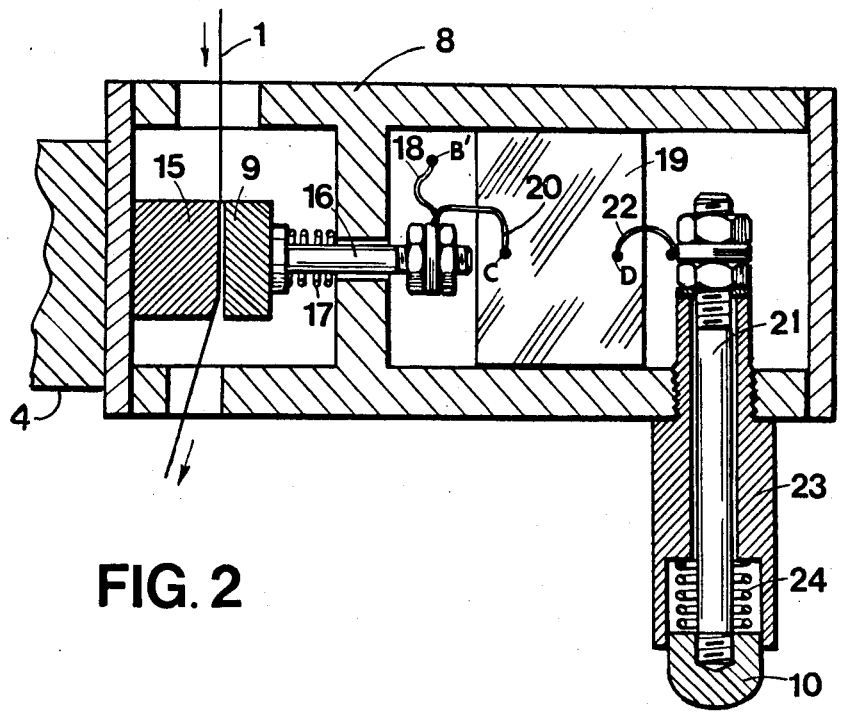
FIG. 2 is a section along line 2—2 of FIG. 1 of a portion of the apparatus illustrated at FIG. 1.

As illustrated in details at FIG. 2, which is a cross-section of the electrode wire support and guide means 8, the electrode wire 1 is in sliding engagement with the support surface of a guiding member 15 and is urged against the surface of the guiding member 15 by the sliding contact 9 mounted on the end of a pushrod 16, the sliding contact 9 being biased towards the guiding member 15 by a coil spring 17. The pushrod 16 is made of electrical conductive material and is connected to the terminal B' by a flexible electric wire 18 and to the terminal C of a capacitor 19 by a flexible electric wire 20. The other terminal D of the capacitor 19 is connected to the end of a second pushrod 21 by means of a flexible electric wire 22. The pushrod 21 slides in an insulating sleeve 23 mounted on the bottom of the housing of the wire electrode guide arm 8 and it carries at its free end the second sliding contact 10 normally applied against the metallic plate 11 by means of a spring 24.

During operation of the apparatus, with the pulse generator connected through the coaxial cable 12 as previously described, the capacitor 19 is charged through a circuit which, in addition to the coaxial cable 12, comprises the flexible cable 13, the workpiece 2, the frame 5 of the EDM apparatus, the metallic plate 11, the sliding contact 10 and the return flexible cable 14. The capacitor is charged relatively slowly because of the self-inductance of the circuit, caused principally by the unshielded electrical connections consisting of the flexible cables 13 and 14. However, when the gap between electrode wire 1 and the workpiece 2 is ionized, the capacitor 19 discharges across the gap through a circuit which is relatively short and which does not include the flexible cables 13 and 14 and, consequently the discharge current pulse have a leading edge which is much steeper than would be the case if the discharges were effected through a circuit having a self-inductance.

It is readily apparent that if the frame 5 of the EDM apparatus is made of material which is non-conductive, or poorly conductive of electricity, the metallic plate 11 is electrically connected to the workpiece 2 by means of an electrically conductive connection.

Having thus described the present invention by way of an example of structural embodiment thereof, modification whereof will be apparent to those skilled in the art, what is claimed as new is as follows:

1. In a device for applying current pulses across a machining zone between an electrode wire and an electrode workpiece in an EDM apparatus wherein said electrode wire and said workpiece are displaced one relative to the other according to a predetermined cutting path cut by said electrode wire in said workpiece, said electrode wire being stretched and displaced along its longitudinal axis between a pair of spaced apart guide arms, said device comprising a first sliding contact mounted on one of said guide arms in engagement with said electrode wire and connected to a terminal of a pulse generator and a second sliding contact mounted on said one of said guide arms proximate said first sliding contact, the improvement comprising at least one capacitor supported proximate said first and second contacts and connected across said first and second contacts, and a metallic electrically conductive plate mounted on the frame of said EDM apparatus and electrically connected to said workpiece, said second contact being in electrical sliding contact with the surface of said plate.

2. The invention of claim 1 wherein said first and second contacts are each provided with a pushrod support member having an end supporting respectively said first and second contact and another end disposed proximate the terminals of said capacitor, and each of said terminals of said capacitor is connected to said another end of one of said pushrods by way of a substantially short flexible electrical conductive wire.

* * * * *

UNITED STATES PATENT AND TRADEMARK OFFICE
CERTIFICATE OF CORRECTION

PATENT NO. : 4,239,952
DATED : December 16, 1980
INVENTOR(S) : Heinz Rhyner

It is certified that error appears in the above-identified patent and that said Letters Patent are hereby corrected as shown below:

Column 2, line 4, change "termals" to --terminals--.

Signed and Sealed this

Seventh Day of April 1981

[SEAL]

Attest:

RENE D. TEGTMEYER

Attesting Officer     Acting Commissioner of Patents and Trademarks